W. R. WILLETTS.

FLUSH VALVE.

APPLICATION FILED JUNE 14, 1913.

Reissued Dec. 16, 1913. 13,658.

Witnesses:
Wm. A. Courtland
Elsie Swenson

Inventor
William R. Willetts
By his Attorney Frank Lorso

UNITED STATES PATENT OFFICE.

WILLIAM R. WILLETTS, OF WATERBURY, CONNECTICUT, ASSIGNOR TO AMERICAN PIN COMPANY, OF WATERBURY, CONNECTICUT, A CORPORATION OF CONNECTICUT.

FLUSH-VALVE.

13,658. Specification of Reissued Letters Patent. Reissued Dec. 16, 1913.

Original No. 996,186, dated June 27, 1911, Serial No. 521,597. Application for reissue filed June 14, 1913. Serial No. 773,764.

*To all whom it may concern:*

Be it known that I, WILLIAM R. WILLETTS, a citizen of the United States, residing at Waterbury, in the county of New Haven and State of Connecticut, have invented certain new and useful Improvements in Flush-Valves, of which the following is a specification.

My invention relates to that form of valve usually employed in flush tanks, which is made hollow for buoyancy and of relatively large diameter to accommodate a valve seat of considerable dimensions. These are usually made of rubber of approximately spherical shape, and have means at the upper side for attachment to the operating rod. When made entirely of rubber they are heavier and more expensive than need be and often become distorted in action, sufficiently sometimes to become inoperative.

My invention has for its object the production of a valve of this nature of cheaper construction, greater durability, and more perfect in operation than those heretofore in use, and to these ends I construct the valve of hollow form, having the lower seating portion of rubber and preferably substantially hemispherical in shape, and secured to an upper cup, preferably of analogous shape, which serves not only to receive the attachment to the operating rod but affords rigid protection and support to the rubber portion of the valve.

My invention comprises also specific details of construction which will be more fully described with reference to the accompanying drawings and then pointed out in the claims.

Figure 1:
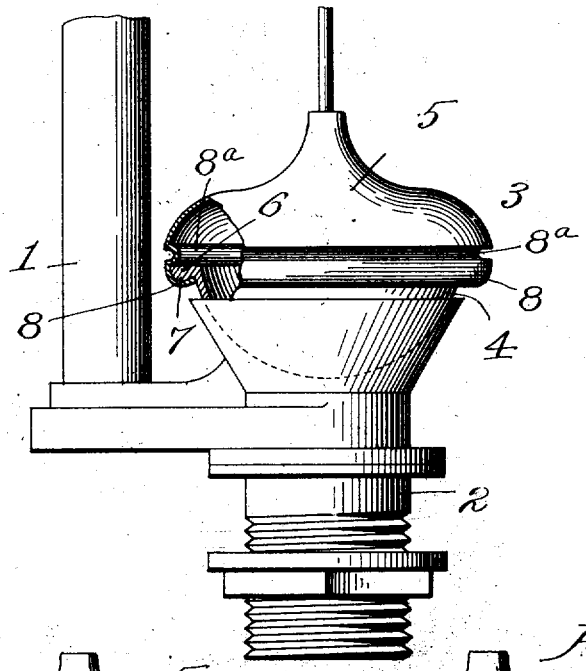
Figure 2:
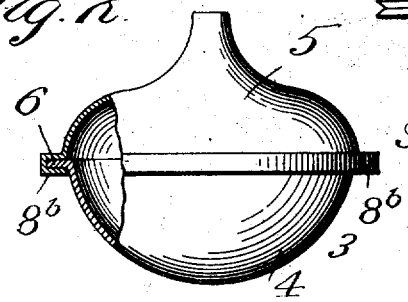
Figure 3:
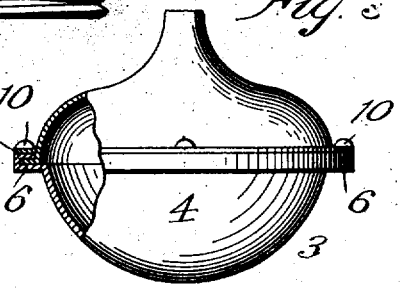
Figure 4:
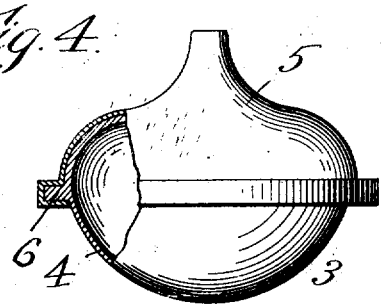
Figure 5:
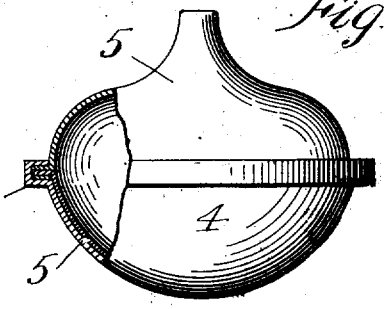

In said drawings, Figure 1 is a sectional elevation of my invention, and of so much of a flushing apparatus as is necessary to enable the understanding of its usual and preferred application. Figs. 2 and 3 are sectional elevations illustrating modified forms of the valve. Figs. 4 and 5 are sectional elevations of further modified forms of the valve.

In carrying out my invention I have found that cheapness, buoyancy, rigidity and durability are all best obtained by forming the lower section only of the valve of suitable yielding material such as for instance rubber, and the upper section of rigid material preferably sheet metal, and the accompanying drawings illustrate only such construction, but in its broadest sense my invention is not confined to this construction, and it is not to be applied to the appended claims except where definitely so stated. It is also to be understood that in describing a part of the valve as made of rubber, this term is used for convenience to cover all equivalent non-metallic substances appropriate for the purpose of making a tight closure against the valve seat. While the above description of the upper section refers to sheet metal as a preferable material, it is obviously implied that any suitable material adapted to render this upper part stiff and unyielding to suit the purpose stated, may be employed.

The invention is shown in Fig. 1 in connection with a flush pipe 1 having a discharge opening at 2 provided with the usual seat for the valve 3. The portion 4 of the valve, which rests in said seat when closed, is made hollow and of rubber, and is preferably of hemispherical or other cup shape not extending above its junction with the upper hollow metallic portion 5, as the omission of the upper hemisphere of rubber effects a saving in weight. I may, however, extend the rubber up within the interior of and to the top of the dome or cup shaped metal portion 5 in some cases as shown in Fig. 4, or this may be reversed, that is, the metal may be extended down in contact throughout with the interior surface of the rubber portion as shown at $5^a$ in Fig. 5.

The rubber portion of the valve may be attached to the metal in various ways. In the form shown in Fig. 1, the rubber is made at its upper rim with a peripherally outwardly extending flange 6 beaded at its lower surface at 7, and the lower rim 8 of the metal cup 5 has the shoulder or bead $8^a$ to seat the rubber part against, and the metal is upset over the bead 7, so as to tightly clasp the two parts of the valve together, preferably so as to make an air-tight joint.

In the form shown in Fig. 2 the flange of the rubber seat portion of the valve is not beaded but straight, and occupies a like channel $8^b$ in the lower rim of the metal cup, being applied thereto either by snapping in place, or by upsetting the said rim thereon, as may be preferred.

In the form shown in Fig. 3 the relation of the parts is reversed, the rim of the rubber being snapped over the outer rim of the cup, and held thereto in any preferred manner, as for example by the metallic ring 9 held by screws or rivets 10.

All of these forms of the invention may be so made as to have a permanent joining of the two half-valves, but are preferably so adjusted as to enable the rubber portion to be removed and replaced. Various other modifications and changes in form may be made without departing from my invention.

It will be noted that this construction has all of the advantages present in the usual all-rubber valve, and is superior to them in lightness, and cheapness of construction, as well as in several other ways. The rigidity of the metallic cup portion prevents expansion of the valve, and its distortion, and so keeps it in form to make a perfect fit with its seat, and prevent its rubbing against the adjacent portions of the mechanism. Its increased buoyancy makes it more effective in action, as it will allow more water to pass before the ball drops. It will also be noted from the illustrations that the rubber portion may be easily removed from the metallic portion when worn out to be replaced by a new one.

I have found in the practical operation of my device that the metallic portion of the valve is to best advantage made of copper or of suitable alloys thereof. However by combining copper with rubber the copper is subject to corrosion through the substances contained in the rubber. I therefore provide the metallic portion of the valve with a non-corrosive coating such as for instance, tin, or a similar non-corrosive metal which will not be affected by the rubber.

I claim:

1. A valve for flush tanks comprising a cup-shaped seating member of yielding material and an air-tight inverted cup-shaped stiffening and supporting member of rigid material, the said members being united at their edges to form a hollow ball, and the said stiffening and supporting member provided near its center with means for attaching it to a lifting rod.

2. A valve for flush tanks comprising a cup-shaped seating member of yielding material and an air-tight inverted cup-shaped stiffening and supporting member of rigid material, the said members being removably united at their edges to form a hollow ball, and the said stiffening and supporting member provided near its center with means for attaching it to a lifting rod.

3. A valve for flush tanks comprising a cup-shaped seating member of yielding material provided with a peripheral flange, and an air-tight inverted cup-shaped stiffening and supporting member of rigid material, having its rim engaging said flange, and the said stiffening and supporting member provided near its center with means for attaching it to a lifting rod.

4. A valve for flush tanks comprising a cup-shaped seating member of yielding material provided with a peripheral flange, and an air-tight inverted cup-shaped stiffening and supporting member of rigid material, having its rim turned over said flange, and the said stiffening and supporting member provided near its center with means for attaching it to a lifting rod.

WILLIAM R. WILLETTS.

Witnesses:
W. W. Bowers,
Harry B. Jenkins.